United States Patent [19]
Andres et al.

[11] Patent Number: 5,384,352
[45] Date of Patent: Jan. 24, 1995

[54] SELF LUBRICATING POLYBENZIMIDAZOLE SHAPED ARTICLES

[75] Inventors: Todd E. Andres; Edwardo Alvarez, both of Houston, Tex.; William M. Cooper, Clinton; O. Richard Hughes, Chatham Township, Morris County, both of N.J.; Wendell G. Whiteside, Houston, Tex.

[73] Assignee: Hoechst Celanese Corp., Somerville, N.J.

[21] Appl. No.: 98,541

[22] Filed: Jul. 28, 1993

[51] Int. Cl.⁶ .......................... C08K 3/04; C08K 3/16; C08K 3/38
[52] U.S. Cl. .................... 524/404; 524/405; 524/406; 524/424; 524/495
[58] Field of Search ............ 524/404, 405, 406, 424, 524/495

[56] References Cited

U.S. PATENT DOCUMENTS 5,229,448 7/1993 Cooper .................. 524/404

Primary Examiner—Kriellion S. Morgan
Attorney, Agent, or Firm—James L. McGinnis

[57] ABSTRACT

A compactible polybenzimidazole composition contains from about 95 to about 5 weight percent of solid lubricant particles which are uniformly dispersed and encapsulated in from about 55 to about 95 weight percent of polybenzimidazole. The solid lubricant comprises graphite and boron nitride in a weight ratio of about 10:1 to about 1:10. The composition is useful for preparing self lubricating, shaped articles such as bearings, bearing sleeves, rings, seals, etc. which exhibit low friction properties.

23 Claims, 2 Drawing Sheets

SELF LUBRICATING POLYBENZIMIDAZOLE SHAPED ARTICLES

FIELD OF THE INVENTION

The present invention is directed to polybenzimidazole compositions containing solid lubricants and a method for preparing self lubricating shaped articles therefrom.

BACKGROUND OF THE INVENTION

Polybenzimidazoles exhibiting very high melting points, high glass transition temperatures, and/or very high viscosities at their melting points often times have very desirable properties such as chemical resistance, temperature resistance, and high strength needed for high performance characteristics. When prepared into powder by the method of precipitation or spray/quenching of polybenzimidazole resin solutions, the polymers exhibit good density and compression characteristics. Compression of the powder into shaped articles results in parts exhibiting excellent strength, modulus, and high tenacity. These properties make polybenzimidazole an economical choice for the replacement of more expensive metal and ceramic powders in the formation of shaped articles. However, polybenzimidazole shaped articles are not highly durable and wear resistant when subjected to friction environments. The articles tend to overheat and degrade under low friction conditions after short periods of time. It is desirable to produce polybenzimidazole compositions that exhibit good mechanical and physical properties, as well as wear resistance in friction environments.

SUMMARY OF THE INVENTION

The present invention is directed to a self lubricating, compactible polybenzimidazole (PBI) composition containing a high temperature PBI intimately combined with low friction solid lubricants wherein the composition contains from about 5 to about 95 weight percent of PBI and from about 95 to about 5 weight percent of solid lubricants selected from graphite, fluorographite, boron nitride, boric acid, boric oxide, molybdenum sulfide, and mixtures thereof, based on the total weight of the composition. The composition is useful for forming low friction, self lubricating shaped articles including bearings, bearing sleeves, rings, seals, etc.

BRIEF DESCRIPTION OF THE DRAWINGS

While the specification concludes with claims particularly pointing out and distinctly claiming the present invention, the present invention may be better understood from the following description in conjunction with the accompanying drawings in which:

DETAILED DESCRIPTION OF THE INVENTION

Figure 1:
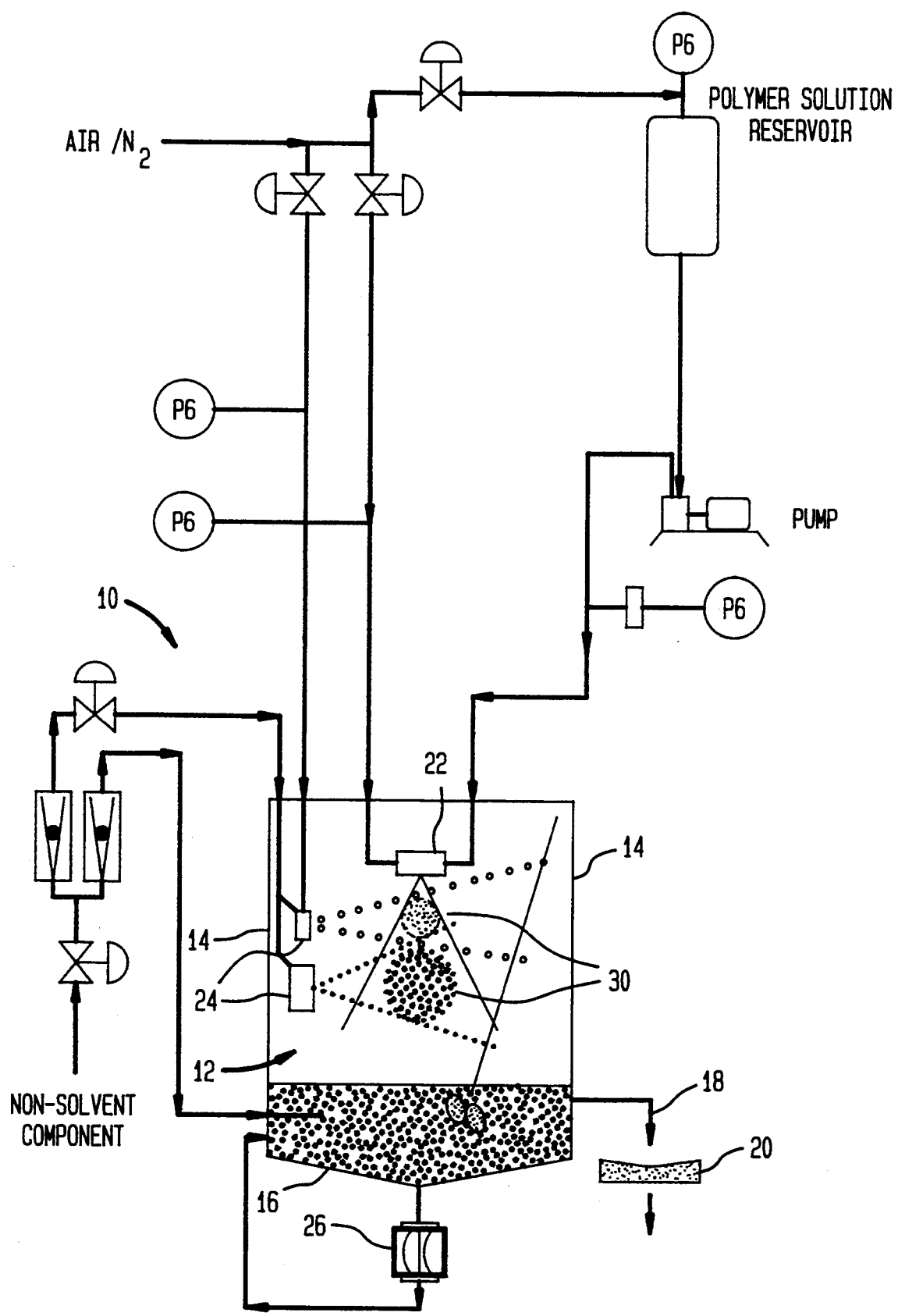
FIG. 1 is a schematic view in elevation of an atomization reactor utilized to form particles of the invention.

The self lubricating polybenzimidazole composition of the present invention contains a PBI resin, solid lubricants, processing aids, and fillers. Generally, the composition contains from about 5 to about 95 weight percent of PBI and from about 95 to about 5 weight percent of a solid lubricant, based on the total weight of the composition. Typically the composition contains from about 65 to about 95 weight percent of PBI and from about 5 to about 35 weight percent of solid lubricants, based on the total weight of the composition. One preferred embodiment of the composition contains about 90 weight percent of PBI and about 10 weight percent of solid lubricants, based on the total weight of the composition wherein the lubricants are selected from graphite and boron nitride in a weight ratio of from about 10:1 to about 1:10. Graphite fibers, which also serve as a filler, may be combined with graphite particles or each component may be used separately to provide the desired weight ratio of graphite in the lubricants. A processing aid may be added to the composition to adhere the particles when forming shaped articles therefrom.

Polymers useful in the highly porous powders of this invention may contain polybenzimidazole known in the art. Typical polymers of this class and their preparation are more fully described in U.S. Pat. No. 2,895,946; U.S. Pat. No. Re. 26,065, and in the Journal of Polymer Science, Vol. 50, pages 511–539 (1961), which are herein incorporated by reference in their entirety. These PBIs consist essentially of recurring units of the following Formulae I and II wherein:

Formula I is

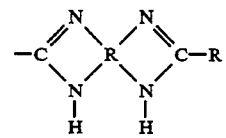

wherein R is a tetravalent aromatic nucleus, preferably symmetrically substituted, with the nitrogen atoms forming the benzimidazole rings being paired upon adjacent carbon atoms, i.e. ortho carbon atoms of aromatic nucleus, and R' is selected from the group consisting of (1) an aromatic ring, (2) an alkylene group, and (3) a heterocyclic ring selected from the group consisting of (a) pyridine, (b) pyrazine, (c) furan, (d) quinoline, (e) thiophene, and (f) pyran, and Formula II is

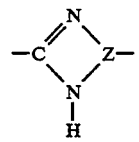

wherein Z is an aromatic nucleus having the nitrogen atoms forming the benzimidazole ring paired upon adjacent carbon atoms of the aromatic nucleus.

Preferably, PBIs are selected from polymers consisting essentially of the recurring units of Formulae I and II, wherein R' is at least one aromatic ring or a heterocyclic ring.

Examples of PBIs which have the recurring structure of Formula I are as follows:
poly-2,2'-(m-phenylene)-5,5'-bibenzimidazole;
poly-2,2'-(pyridylene-3",5")-5,5'-bibenzimidazole;
poly-2,2'-(furylene-2",5")-5,5'-bibenzimidazole;
poly-2,2'-(naphthalene-1",6")-5,5'-bibenzimidazole;
poly-2,2'-(biphenylene-4",4")-5,5'-bibenzimidazole;
poly-2,2'-amylene-5,5'-bibenzimidazole;

poly-2,2'-octamethylene-5,5'-bibenzimidazole;
poly-2,6'-(m-phenylene)-diimidazobenzene;
poly-2,2'-cyclohexeneyl-5,5'-bibenzimidazole;
poly-2,2'-(m-phenylene)-5,5'-di(benzimidazole) ether;
poly-2,2'-(m-phenylene)-5,5'-di(benzimidazole) sulfide;
poly-2,2'-(m-phenylene)-5,5'-di(benzimidazole) sulfone;
poly-2,2'-(m-phenylene)-5,5'-di(benzimidazole) methane;
poly-2',2''-(m-phenylene)-5',5''-di(benzimidazole) propane-2,2; and poly-2',2''-(m-phenylene)-5,5''-di(benzimidazole) ethylene-1,2 wherein the double bonds of the ethylene groups are intact in the final polymer.

The preferred PBI is poly-2,2'-(m-phenylene)-5,5'-bibenzimidazole, the recurring unit of which is:

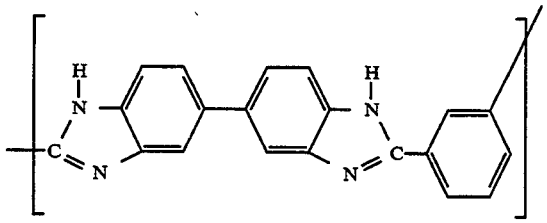

Representative techniques for preparing PBIs are disclosed in U.S. Pat. Nos. 3,509,108; 3,549,603; and 3,551,389, which are assigned to the assignee of the present invention and are herein incorporated by reference in their entirety. A useful PBI of the present invention is poly-2,2'-(m-phenylene)-5,5'-bibenzimidazole, and a preferred PBI is Celazole ® U-60 distributed by Hoechst Celanese Corporation, Somerville, N.J.

The PBI particles of the present invention may be prepared by several methods including melt polymerization, dissolution, precipitation, and spray/quench reprecipitation. In a first embodiment, the particles may be melt polymerized according to the method disclosed by Ward et al., U.S. Pat. No. 4,814,530, herein incorporated by reference in its entirety. This melt polymerized PBI powder may be blended with one or more solid lubricants fillers and processing aids to form a homogeneous powder blend which may be shaped by hot compression molding.

The embodiments of precipitation and spray/quenching require the preparation of a PBI solution. While any substance that will dissolve PBI is suitable for forming the solution of the invention, typical solvents are N,N'-dimethylacetamide, N,N'-dimethylformamide, dimethylsulfoxide, and N-methyl-2-pyrrolidone, formic acid, acetic acid, sulfuric acid, polyphosphoric acid, and methanesulfonic acid. Particularly, the preferred solvent is N,N'-dimethylacetamide (DMAc).

Methods of dissolving the polymer in a variety of solvents are known to those skilled in the art. One suitable method requires drying the starting polymer resin to a moisture level of about 2 weight percent in a vacuum oven at a temperature of about 100° to about 160° C. for about 10 to about 16 hours. Preferred conditions for dissolving the polymer comprises heating the polymer and solvent in a stainless steel reactor at a pressure from about 2 to about 7 atmospheres for about 2 hours at a temperature from about 25° to about 125° C. The resulting solution is preferably filtered to remove any undissolved polymer prior to being processed.

The solution of the PBI resin dissolved in a suitable solvent generally contains from about 5 to about 35 percent by weight of PBI solids, based on the total weight of the solution. Typically, however, the solution will contain from about 10 to about 30 percent by weight of solids, and preferably, the solution will contain about 12 percent by weight of PBI solids, based on the total weight of the solution.

In the methods of precipitation and spray/quenching, the miscibility of the solvent and a non-solvent causes formation of the self lubricating particles which are collected, washed to remove residual solvent, and dried. The non-solvent may be any solution which is miscible with the solvent but not the PBI resin of the solution. Typical non-solvents useful with the solvents referenced hereinbefore include water and $C_1$ to $C_4$ aliphatic alcohols, e.g., methanol, ethanol, etc. However, because of economical and safety considerations, the preferred non-solvent is water.

In one embodiment of precipitation of lubricant-filled PBI particles, the PBI solution is added to a suitable non-solvent (i.e., direct precipitation) or the non-solvent is added to the solution (i.e., reverse precipitation) under constant agitation to prepare the particles of the invention. In either case, sufficient non-solvent must be utilized to separate the resin from the solvent solution. Thereafter, the solid lubricants, fillers, and processing aid may be blended with the particles to form the lubricant-filled PBI composition.

In a preferred embodiment of the invention a PBI shaped article that exhibits self lubricating properties such as low wear and friction may be formed from a compactible powder containing PBI powder, as a continuous phase, intimately combined with a dispersion of solid lubricants wherein the composition containing from about 65 to about 95 weight percent of polybenzimidazole and from about 5 to about 35 weight percent of solid lubricants, based on the total weight of the composition, is prepared by the steps of:

(a) dissolving polybenzimidazole resin in a suitable solvent to prepare a polybenzimidazole dope;
(b) dispersing solid lubricants selected from the group consisting of graphite, fluorographite, boron nitride, boric acid, boric oxide, molybdenum sulfide, and mixtures thereof into the polybenzimidazole dope to form a lubricant-filled polybenzimidazole dope suspension;
(c) precipitating or spray/quenching the lubricant-filled polybenzimidazole dope suspension by adding a non-solvent thereto to form a lubricant-filled polybenzimidazole powder; and
(d) compacting the lubricant-filled polybenzimidazole powder into a self lubricating, shaped article.

Particularly, the PBI solution may be spray/quenched by spraying it into an atmosphere of an atomized non-solvent to form porous PBI particles. An atomization reactor system, as illustrated in FIG. 1, is utilized to form the highly porous particles of the invention. The reactor system (10) has a cylindrical vessel (12) with upstanding side walls (14) and a cone-shaped bottom (16) with an outlet (18) equipped with a particle separation system (20). Typical reactor dimensions are about 36 inches in diameter by about 37 inches in height. A plurality of nozzles are contained within the reactor. The first set of nozzles (22), slidably attached to the top-center of the reactor, are utilized to atomize the resin solution downwardly into the reactor. A second set of nozzles (24), equaling about four times the quantity of the first nozzle set, separated into an equal number of rows (i.e., four), equally spaced and attached to the reactor side walls at positions well below the first nozzle set, are utilized to atomize the non-solvent component in a direction perpendicular to the atomization direction of the resin solution to create an aggregation zone, wherein rounded particles are formed. A recirculation pump (26) is positioned in the bottom of the reactor to maintain suspension of the rounded particles in the non-solvent solution prior to discharging through outlet (18).

The atomization nozzles, manufactured by Spraying Systems of Wheaton, Ill., produce a wide-angle rounded spray pattern when fitted with a Spray Systems No. 1 set-up containing Fluid Cap 2050 and Air Cap 64. Under normal operation at about 60 psi the nozzles are capable of delivering 0.79 gallons of liquid per hour with a spray angle of about 18 degrees. To aid atomization, a gas such as air or nitrogen may be fed into a second inlet of nozzles (22) as is typical of gas-operated atomization nozzles. The first set of nozzles (22) are suspended along the upper-vertical axis of the reactor in such a way as to spray fine droplets of the resin solution down into the reactor. The non-solvent component (e.g., water or alcohol) is fed into a first inlet of each of the second set of nozzles (24) while a compressed gas such as air or nitrogen is fed into a second inlet of each second nozzle (24) to aid in atomization. When the non-solvent component is water, from about 1 to about 2 weight percent DMAc may be added thereto to aid in particle formation.

During operation of the reactor, a polymer solution aerosol spray is discharged from the first set of nozzles (22) downwardly into an atomized atmosphere of the non-solvent component to form a reaction zone (30) wherein highly porous particles are formed. An initial quantity of non-solvent component, e.g., water, is accumulated in the reactor bottom to maintain suspension of the formed particles, as well as to complete any residual precipitation from solution that may be necessary. Typically, the reactor is operated at atmospheric pressure, but other pressures are possible. The contents in the bottom of the reactor (i.e., polymeric particles suspended in a solution of the solvent and non-solvent) are constantly recirculated to aid in suspension of the particles before discharging through outlet (18). To separate the suspended particles from the solvent/non-solvent solution, the outlet of the reactor is typically equipped with a separation system (20). The separation system may comprise any of several processes known to those skilled in the art, including vacuum filtration or centrifugation. For example, the particles may be collected on a filter and washed to remove residual solvent and non-solvent components, or the slurry may be centrifuged to produce a wet cake which is washed and dried. The wet cake that results after filtration or centrifugation must be dried to a low moisture content and may be mixed with a processing aid to assist in cold compactibility. One of several approaches may be adopted: 1) wet cake powder may be dried to lower non-solvent content ($<7$ wt %) and humidified to a desired moisture content (7-12 wt %); or 2) the wet cake powder may be dried directly to remove all moisture (when the non-solvent is water). Thereafter, the dried, free-flowing highly porous powder may be milled and screened to produce a submicron powder prior to the addition of a processing aid and fillers.

In a preferred method of forming the self lubricating composition, a slurry is prepared by suspending one or more solid lubricants in the PBI solution followed by precipitating the slurry according to the methods described herein. The addition of one or more solid lubricants to the PBI solution prior to particle formation is believed to cause polymer encapsulation of the lubricants which results in shaped articles exhibiting improved tensile strength and elongation.

Generally, the solid lubricants useful in the polymeric composition of the present invention include lubricants selected from graphite crystals and fibers, fluoronated graphite polymers, boron nitride, anhydrous boric acid, boric oxide, molybdenum disulfide, and mixtures thereof. Preferably, the lubricants will include graphite crystal particles and/or graphite fibers, and boron nitride. Preferred crystal particles are those distributed by Superior Graphite Co. under the names Crystalline Graphite, High Purity Grade 4939 TM, exhibiting a particle size of about 5 $\mu$m, and Crystalline Graphite Grade 4735 TM, exhibiting a particle size of about 45 $\mu$m. A preferred graphite fiber which also act as a filler or reinforcement agent of the shaped articles is Magnamite Fibers 1810AS TM distributed by Hercules. A fluorinated graphite useful in the invention is Fluorographite TM distributed by Ozark-Mahonong Company. One boron nitride useful in the invention is distributed by Union Carbide under the name UCAR Boron Nitride Powder Grade HCP TM. A boric acid useful in the invention, exhibiting a particle size of about 45 $\mu$m, is distributed by U.S. Borax Company. The molybdenum disulfide useful in the invention is Molysulfide TM exhibiting an initial median particle size of about 1 to about 2 $\mu$m. Essentially, the components of the solid lubricants are dry blended in predetermined proportions prior to being combined with the polybenzimidazole solution.

A processing aid, utilized to couple the particles, may be added to the lubricant-filled PBI prior to formation of the shaped articles. The processing aid may contain a tertiary organic component as an active ingredient, e.g., neoalkenolate-tris(3-amino)phenylatozirconium (VI). The preferred processing aid is NZ09 TM distributed by Petro Chemicals, Kenrich, Calif. A mixture of about 90 wt % of NZ09 and about 10 wt % of PBI particles are blended together to form a NZ09 Master Batch which may be added to dry component blends. Typically, the processing aid is added to the compositon in an amount of from about 1 to about 5 weight percent, based on the total weight of the composition.

Other fillers known to those skilled in the art may be added to the present invention during slurry formation or dry blended therewith after a powder has been formed. Representative fillers are selected from calcium silicate, silica, clays, talc, mica, polytetrafluoroethylene, graphite fiber, alumina trihydrate, sodium aluminum carbonate, barium ferrite, etc. Most desirable are fillers which also serve to function as solid lubricants. Reinforcing fillers such as chopped glass fiber, silicon carbide whiskers, alumina whiskers, and commercial whiskers, e.g., Tismo and Alborex, also may be added to the composition.

After addition of processing aid and fillers to the powder, dense, shaped articles such as bearings, bearing sleeves, rings, sleeves, and other self lubricating articles which exhibit good mechanical and physical properties may be prepared by: 1) hot compression molding; or 2) a two step process of cold compaction of the composite powder to a porous body, and powder-assisted hot isostatic pressing ("Hipping"). In the cases of dry blended, precipitated, or spray/quenched compositions, the processing aid is added to a homogeneous blend, and the aggregate is compacted into a self lubricating polybenzimidazole shaped article. The preferred method of forming shaped articles is that of cold compacting the composition into a densified article and hipping according to the method and apparatus illustrated in FIG. 2, hereinafter.

Figure 2:
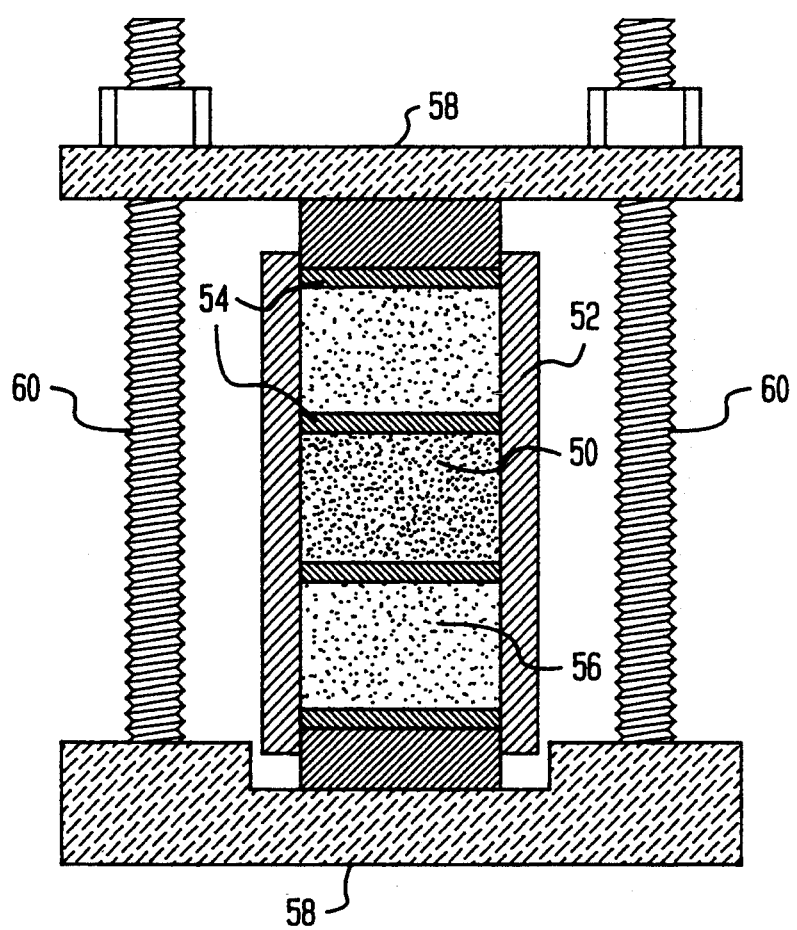
FIG. 2 is a front view in elevation of a heat treating shell system utilized to prepare shaped articles of the invention.

Referring to FIG. 2, the polymeric composition (50) is placed into the molding means (52) followed by optionally placing end plates (54) on each side of the composition. Next, the flowable resilient, compactible material (56), e.g., Graphite 9400 ™ from Superior Graphite, is placed in the molding means over the end plates in such a way that the composition is separated from the resilient, compactible material. Optionally, additional end plates may be placed over the compactible material to prevent any loss from the molding means. Thereafter, the molding means (52) containing the aforementioned components is placed into a clamping means comprising slidingly opposed base plates, consisting of a first base plate having a raised surface (58) and second base plate having a raised surface (58) connected by locking means (60) in such a way that the base plates raised surfaces slidably contact the resilient compactible material or optional end plates. A uniaxial pressure placed against the base plates to force the raised surfaces to slide inward and cause a pressure transmission to the polymeric material. The pressure is held constant by locking means (60), and the heat treating shell system is placed into an oven containing an air or inert gas atmosphere such as nitrogen, argon, etc., at the desired temperature for the desired dwell time. Upon completion of the heat treating step, the pressure of the molding means is reduced to atmospheric conditions, the clamping means is disassembled, the molding means withdrawn therefrom, and the heat treated, shaped polymeric article is removed. During the process, the polymeric composition is compacted by a pressure transmission from the pressurizing means to the clamping means to the resilient, compactible material to the polymeric composition by way of the molding means. The process utilizes pressures ranging from about 2 to about 60 ksi, heat treating temperatures ranging from about 200° to about 900° F., and heat treating times ranging from about 5 to about 10 hours.

Unless otherwise noted, tensile strength and elongation was measured according to ASTM No. D638. Dynamic coefficient of friction, static coefficient of friction, and wear rate was measured according to ASTM No. D2714.

The following examples are general illustrations of preparing the polymeric composition of the invention. They are provided for purposes of exemplification only as should be appreciated from the foregoing discussion.

EXAMPLE 1

A PBI solution containing 12 wt % of PBI resin was prepared by dissolving 540 gm of PBI in sufficient DMAc. Afterwards, 18 gm of Graphite 4939 powder and 42 gm of HCP boron nitride powder were homogeneously blended to prepare the solid lubricant powder blend which was added to the solution to produce a slurry containing 3 wt % of dispersed graphite (Gr) and 7 wt % of dispersed boron nitride (BN). Utilizing the apparatus of FIG. 1, the slurry was fed through a pumping system to the first set of nozzles at a rate of 12.4 cm$^3$/min and a pressure of 30 psi along with nitrogen gas at 15 psi fed to the same nozzle to atomize the slurry. A non-solvent, water, in the amount of 75,700 gm was purged with nitrogen for 48 hours followed by the addition of 764 gm of DMAc thereto to prepare a 1 wt % DMAc solution. A portion of the water was utilized to provide a liquid layer in the bottom of the tank, and the excess water was fed to the second set of nozzles located in the tank at a rate of 1080 cm$^3$/min assisted by nitrogen gas at 10 psi and a pressure of 25 psi. Highly porous, rounded particles, formed as a result of the operation, were collected from the bottom of the tank, filtered, centrifuged, washed and dried. These particles were milled in a mixer with high speed rotor/stator head and dried. Thereafter, the particles were compacted into disks utilizing the apparatus of FIG. 2. The compaction pressure of 2 ksi and temperature of 890° F. were used in preparing the disks. Results of mechanical and tribological analyses performed on the disks are presented below in TABLE I.

EXAMPLE 2

A substantially similar procedure to that of Example 1, was utilized to prepare disks from a polybenzimidazole slurry containing 7 wt % graphite and 3 wt % boron nitride. Results of mechanical and tribological analyses performed on the disks are presented below in TABLE I for comparison.

Comparative Examples 3 to 5

Substantially similar procedures to Example 1 were utilized to prepare disks containing PBI with 10, 20 and 31 wt % levels of uniformly dispersed boron nitride particles. The boron nitride utilized in these examples was HCP. Results of mechanical and tribological analyses performed on the disks are presented below in TABLE I for comparison.

Comparative Examples 6 to 8

Substantially similar procedures to Example 1 were utilized to prepare disks containing PBI with 5, 10 and 15 wt % levels of uniformly dispersed graphite particles. The graphite utilized in these examples was Graphite 4939. Results of mechanical and tribological analyses performed on the disks are listed below in TABLE I.

TABLE I

| | | Disk Properties | | | | |
|---|---|---|---|---|---|---|
| Ex | Lub. Syst, wt % | Wear Rate,* $10^{-3}$ in/hr | Coef. Frict stat/dynmc | | Temp. Rise, °C. | Tens Strg, ksi | Elng, % |
| 1 | 3 Gr, 7 BN | 0.67 | .302 | .082 | 161 | 21.6 | 2.4 |
| 2 | 3 BN, 7 Gr | 0.39 | .289 | .07 | 156 | 17.9 | 2 |
| 3 | 10 BN | 2.05 | .419 | .081 | 155 | 18.3 | 1.9 |
| 4 | 20 BN | 1.87 | .359 | .088 | 159 | 17 | 1.7 |
| 5 | 31 BN | 1.68 | .26 | .09 | 138 | 22.4 | 2.5 |
| 6 | 5 Gr | 9.42 | — | .29 | — | 32.4 | 4.2 |
| 7 | 10 Gr | 9.11 | — | .2 | — | 14.6 | 1.36 |
| 8 | 15 Gr | 3.14 | .326 | .213 | 300 | — | — |

*@ Pressure of $10^2$ psi, Velocity of $10^3$ ft/min.

Table I illustrates that disks containing a solid lubricants of graphite and boron nitride exhibit reduced wear rates and coefficients of friction. Tensile strength and elongation of the disks are substantially comparable to that of disks containing lubricants of graphite or boron nitride.

We claim:

1. A self lubricating, compactible polybenzimidazole composition comprising a high temperature aromatic polybenzimidazole intimately combined with solid lubricants wherein the composition comprises from about 5 to about 95 weight percent of polybenzimidazole and from about 95 to about 5 weight percent of solid lubricants selected from the group consisting of graphite, fluorographite, boron nitride, boric acid, boric oxide, molybdenum sulfide, and mixtures thereof, based on the total weight of the composition, wherein the solid lubricants include graphite and boron nitride in a weight ratio from about 10:1 to about 1:10.

2. The composition according to claim 1 wherein the polybenzimidazole is poly-2,2'-(m-phenylene)-5,5'-bibenzimidazole.

3. The composition according to claim 2 wherein the solid lubricants consist of graphite and boron nitride in a weight ratio from about 10:1 to about 1:10.

4. The composition according to claim 3 wherein the graphite is selected from the group consisting of graphite fibers, graphite particles and mixtures thereof.

5. The composition according to claim 4 which consists essentially of about 90 weight percent of polybenzimidazole and about 10 weight percent of solid lubricants.

6. The composition according to claim 5 wherein the solid lubricants consist of graphite and boron nitride in a weight ratio of 3:7.

7. The composition according to claim 5 wherein the solid lubricants consist of graphite and boron nitride in a weight ratio of 7:3.

8. A shaped article prepared from the composition according to claim 6.

9. A shaped article prepared from the composition according to claim 7.

10. The shaped article according to claim 8 which exhibits a dynamic coefficient of friction of about 0.08.

11. The shaped article according to claim 9 which exhibits a dynamic coefficient of friction of about 0.07.

12. The shaped article according to claim 10 which exhibits a static coefficient of friction of less than about 0.3.

13. The shaped article according to claim 11 which exhibits a static coefficient of friction of less than about 0.29.

14. The shaped article according to claim 12 having a wear rate of about $0.67 \times 10^{-3}$ in/hr at a velocity of about $10^3$ ft/min and pressure of about $10^2$ lb/in$^2$.

15. The shaped article according to claim 13 having a wear rate of about $0.39 \times 10^{-3}$ in/hr at a velocity of about $10^3$ ft/min and pressure of about $10^2$ lb/in2.

16. A method of preparing a self lubricating polybenzimidazole shaped article comprising a composition of polybenzimidazole intimately combined with solid lubricants, wherein the composition comprises from about 5 to about 95 weight percent of polybenzimidazole and from about 95 to about 5 weight percent of solid lubricants, based on the total weight of the composition, comprising the steps of:

(a) dissolving polybenzimidazole resin in a suitable solvent to prepare a polybenzimidazole dope;

(b) dispersing solid lubricants selected from the group consisting of graphite, fluorographite, boron nitride, boric acid, boric oxide, molybdenum sulfide, and mixtures thereof and including graphite and boron nitride in a weight ratio of about 10:1 to about 1:10 into the polybenzimidazole dope to form a lubricant-filled polybenzimidazole dope suspension;

(c) precipitating or spray/quenching the lubricant-filled polybenzimidazole dope suspension by adding a non-solvent thereto to form a lubricant-filled polybenzimidazole powder; and (d) compacting the lubricant-filled polybenzimidazole powder into a self lubricating, shaped article.

17. The method according to claim 16 wherein the polybenzimidazole is poly-2,2'-(m-phenylene)-5,5'-bibenzimidazole.

18. The method according to claim 17 wherein the solid lubricants consist of graphite and boron nitride in a weight ratio of 10:1 to 1:10.

19. The method according to claim 18 wherein the suitable solvent is N,N'-dimethylacetamide and the non-solvent is water.

20. The method according to claim 19 wherein the shaped article is compacted at a pressure ranging from about 2 to about 60 ksi.

21. The method according to claim 20 wherein the shaped article is heat treated at a temperature of from about 200° to about 900° F. for a period of from about 5 to about 10 hours.

22. The composition according to claim 1, wherein the composition comprises about 65 to about 95 weight percent of polybenzimidazole and about 35 to about 5 weight percent of solid lubricants.

23. The method according to claim 16, wherein the composition comprises about 65 to about 95 weight percent of polybenzimidazole and about 35 to about 5 weight percent of solid lubricants.

* * * * *